UNITED STATES PATENT OFFICE.

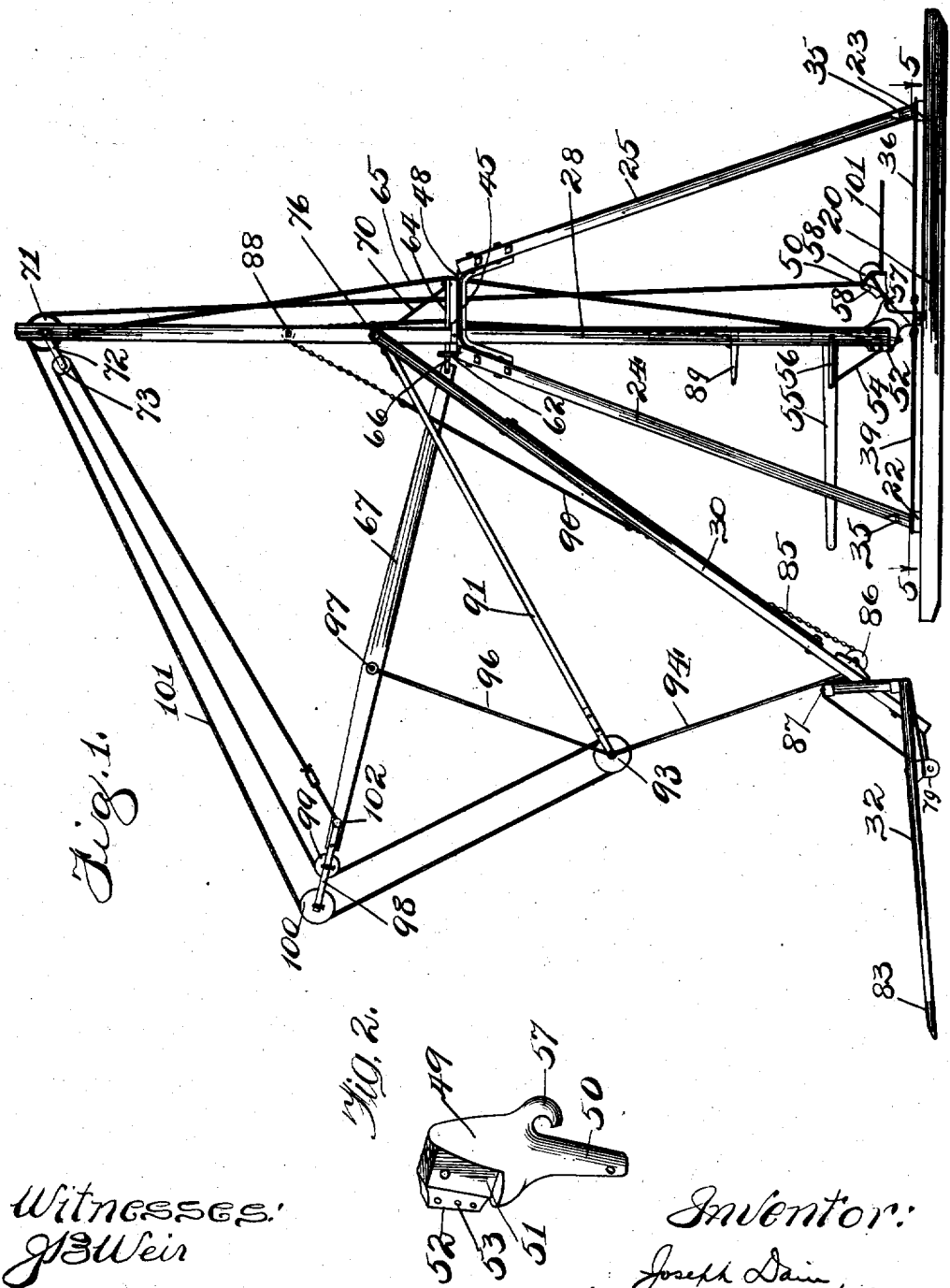

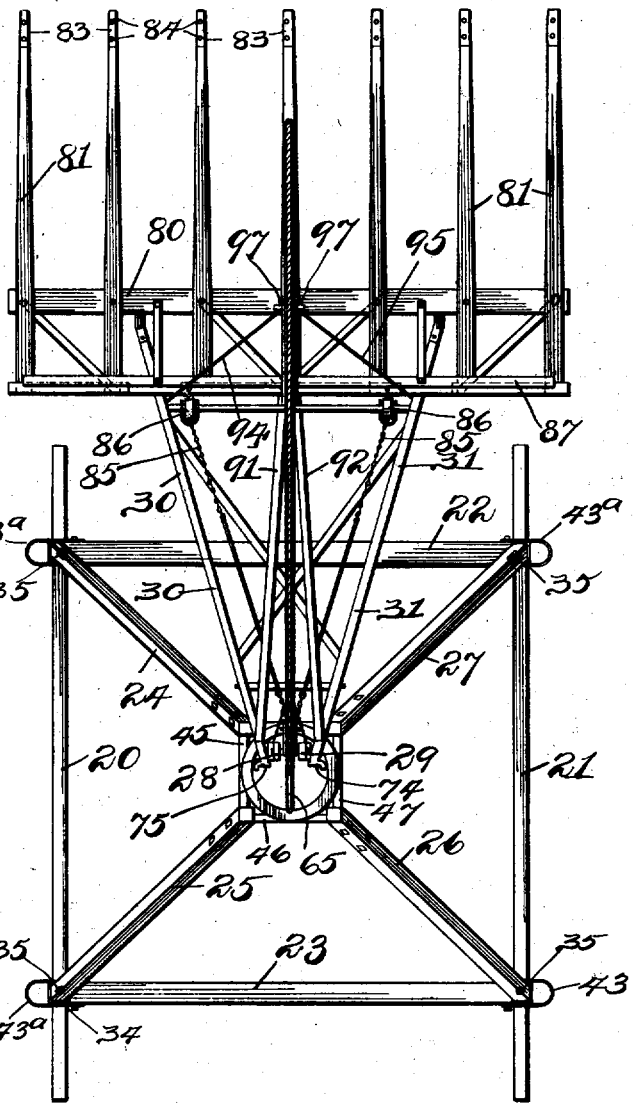

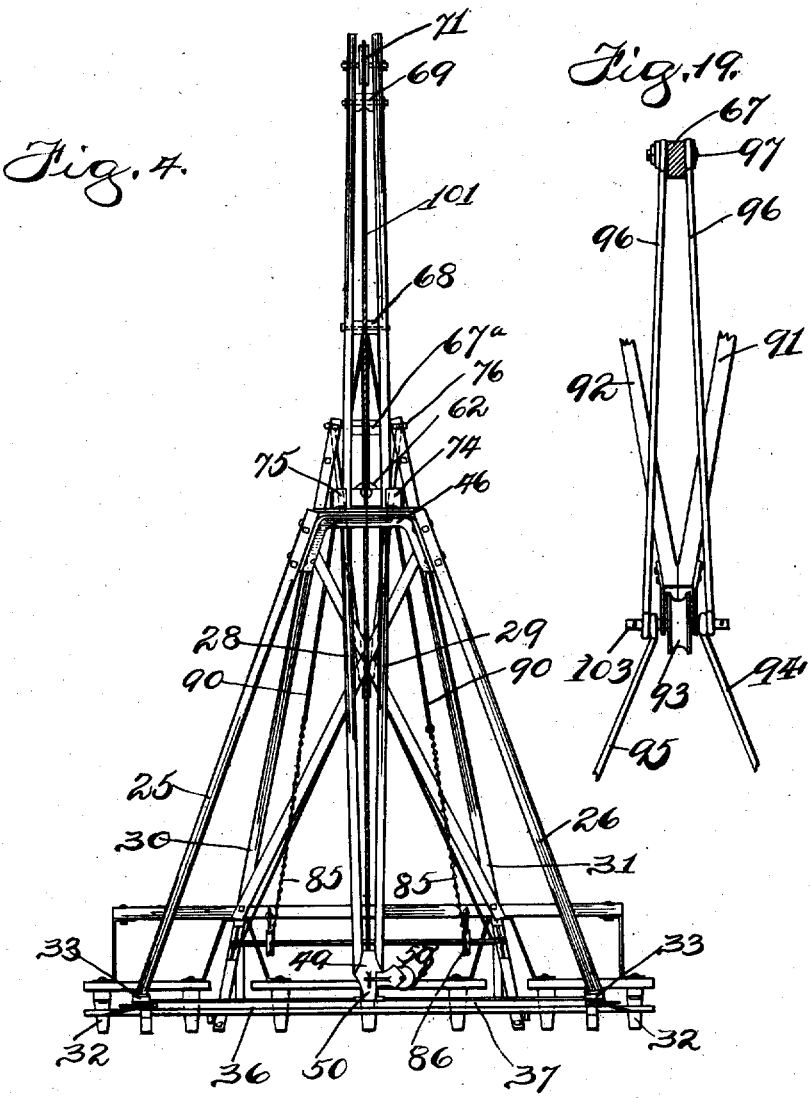

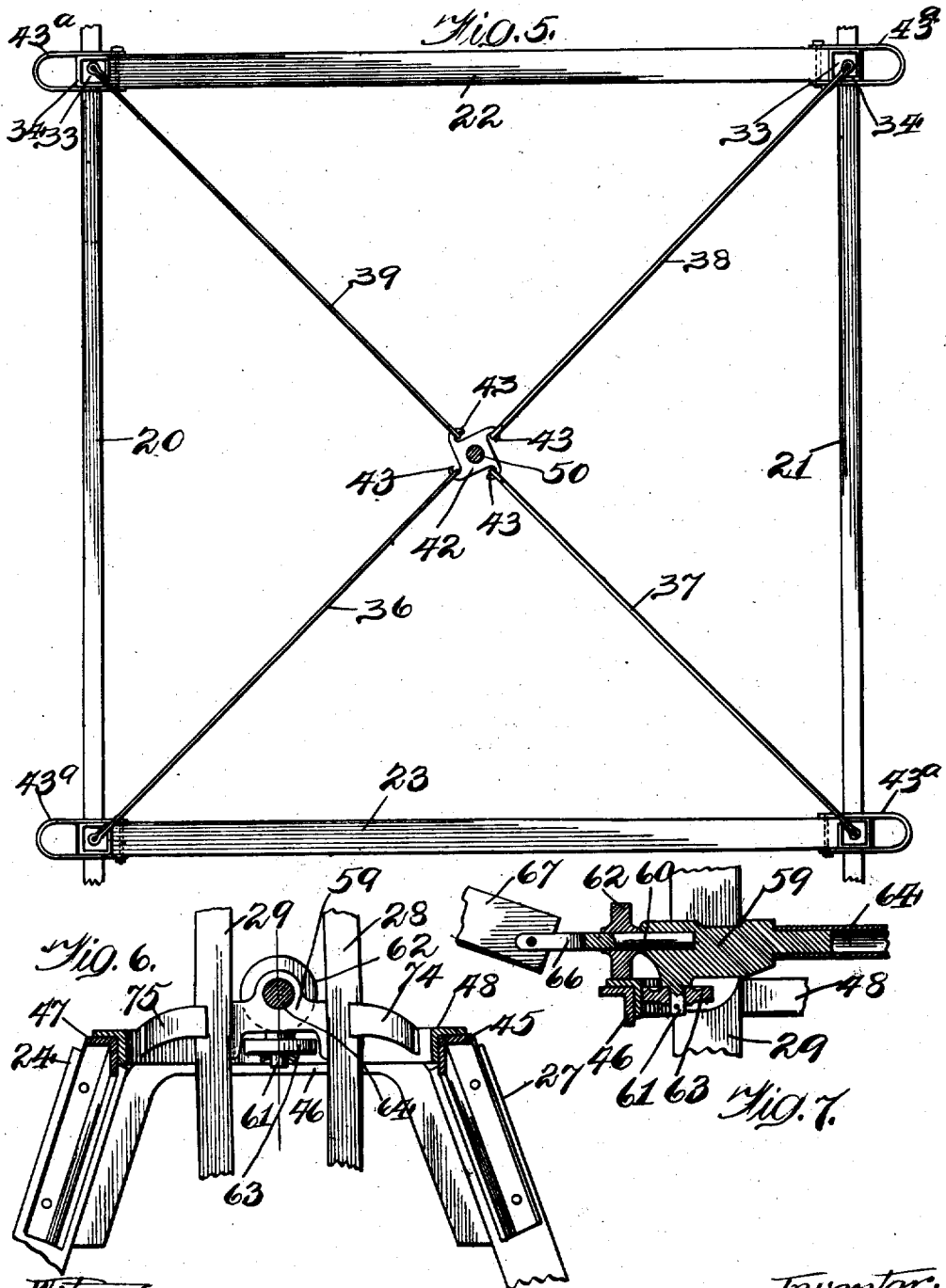

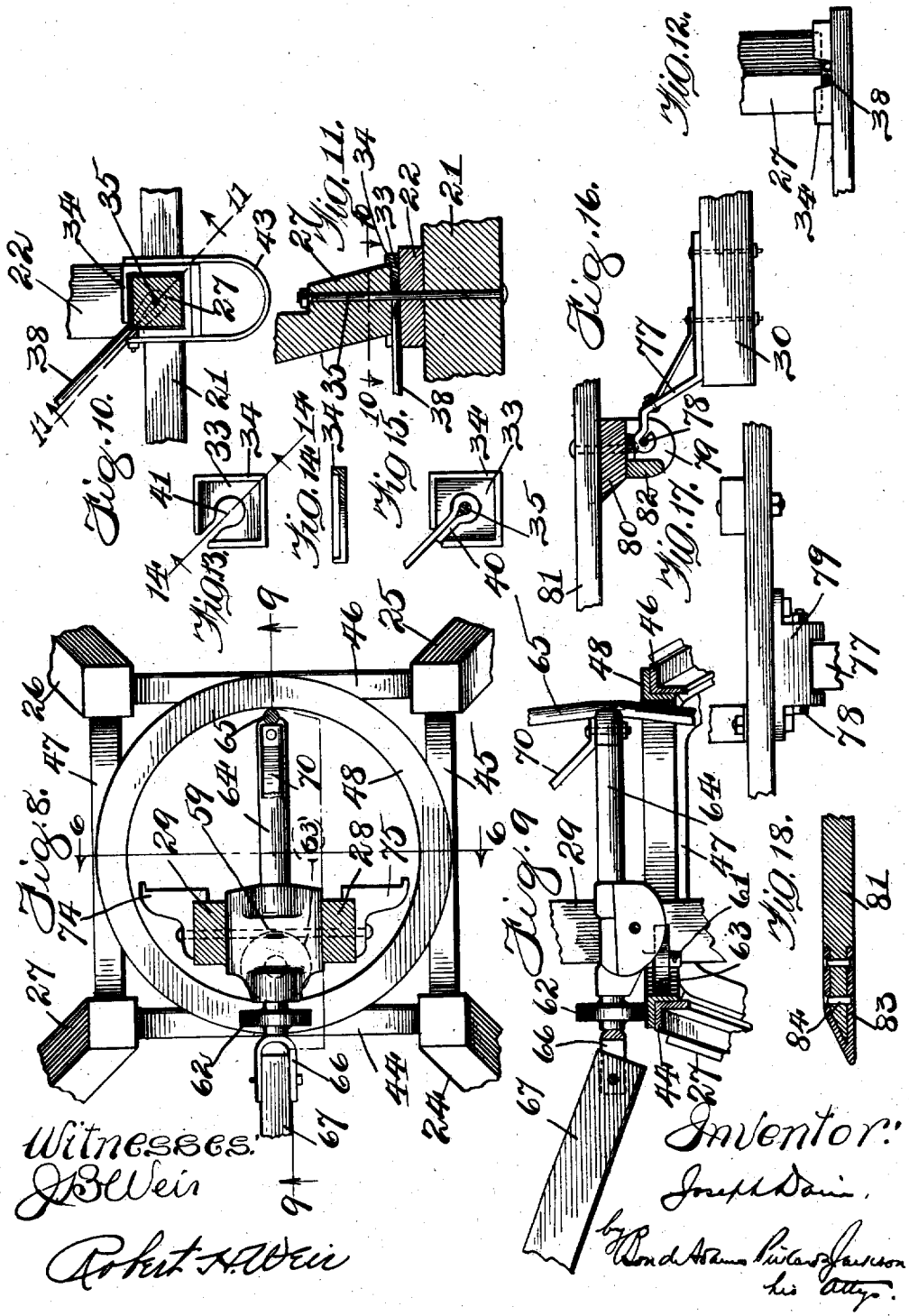

JOSEPH DAIN, OF OTTUMWA, IOWA, ASSIGNOR TO DAIN MANUFACTURING COMPANY OF IOWA, OF OTTUMWA, IOWA, A CORPORATION OF IOWA.

HAY-STACKER.

No. 901,073.  Specification of Letters Patent.  Patented Oct. 13, 1908.

Application filed May 14, 1906. Serial No. 316,674.

*To all whom it may concern:*

Be it known that I, JOSEPH DAIN, a citizen of the United States, residing at Ottumwa, in the county of Wapello and State of Iowa, have invented certain new and useful Improvements in Hay-Stackers, of which the following is a specification, reference being had to the accompanying drawings.

My invention relates to hay-stackers and particularly to stackers of that type known as swing-around stackers, in which the hay is elevated on a fork carried at the outer end of a boom which is connected with the mast and provided with hoisting mechanism arranged so that the hay when elevated may be swung around through an arc of greater or less extent to permit the hay to be deposited at the point desired. A stacker of this type is illustrated and described in my pending application No. 286,092, filed November 6, 1905.

The object of my present invention is to provide certain improvements in the construction of stackers of the type referred to, and it consists in the combination and arrangement of parts illustrated and described and particularly pointed out in the claims hereto appended.

In the accompanying drawings,—Figure 1 is a side elevation; Fig. 2 is a detail, being a perspective view of the pivot block at the lower end of the mast; Fig. 3 is a plan view; Fig. 4 is an end elevation; Fig. 5 is a horizontal section on line 5—5 of Fig. 1, showing the lower portion of the frame of the base; Fig. 6 is an enlarged detail, being a vertical section on line 6—6 of Fig. 8; Fig. 7 is a vertical section on line 7—7 of Fig. 6; Fig. 8 is a plan view of the parts shown in Fig. 9, some parts being shown in section; Fig. 9 is a vertical section on line 9—9 of Fig. 8; Fig. 10 is a detail, being a section on line 10—10 of Fig. 11; Fig. 11 is a vertical section on line 11—11 of Fig. 10; Fig. 12 is an elevation of certain parts shown in Fig. 11; Fig. 13 is a plan view of one of the corner plates on which the uprights rest; Fig. 14 is a section on line 14—14 of Fig. 13; Fig. 15 is a detail, illustrating the manner in which the braces of the base are connected; Fig. 16 is a detail, partly in section, illustrating the manner in which the members of the boom are connected with the fork; Fig. 17 is a front view of the parts shown in Fig. 16; Fig. 18 is a partial sectional view of one of the fork teeth; and Fig. 19 is a detail, partly in section, illustrating the rods connecting the jib with certain parts of the boom.

The stacker which forms the subject-matter of my present application is in general similar to that which forms the subject-matter of my application No. 286,092, hereinbefore referred to, in that it comprises a mast, the lower end of which is stepped in a suitable bearing carried by a rectangular base,—the weight of the mast being, however, carried by a frame composed of four inwardly-converging posts, which, at their lower ends are secured to the corners of the base above mentioned, and, at their upper ends, are fixedly secured together and carry a turntable or circular track or way upon which the weight of the mast is supported as it rotates. The four posts mentioned, together with the base and their connections, form a supporting frame which carries the operating parts of the machine.

The mast is provided with a boom which extends outwardly therefrom, being pivotally secured thereto so that it may be swung upward or downward to raise or lower the fork which is pivotally carried at the outer end of the boom. The arrangement and operation of the boom and of the devices for raising and lowering it, as herein shown and described, involve to some extent the same principles, generally considered, as in the construction of my pending application above referred to, but my present construction is simpler though equally efficient. The construction of the base and the devices for securing the frame in position also differ from the construction shown in my earlier application, and there are also certain differences in various other parts of the apparatus, as will be hereinafter pointed out.

Referring to the drawings,—20 and 21 indicate the side members of the rectangular base and 22 and 23 the end members thereof, as best shown in Figs. 1, 3 and 5. 24, 25, 26 and 27 indicate the posts of the supporting frame, as shown in Figs. 1 and 3. 28—29 indicate the members of the mast, as shown in Figs. 1, 4, 6 and 8. 30—31 indicate the members of the boom. 32 indicates the fork. The specific arrangement of these several parts will be described more in detail hereinafter.

As best shown in Fig. 1, the ends of the side members 20—21 of the base are beveled or inclined after the manner of runners, so that the base forms in effect a sled on which the apparatus may be moved from place to place. In order to form a secure and stable support which will be capable of enduring the rough treatment to which it is subjected in being hauled about, I provide corner-plates 33, one for each corner of the base, which plates are countersunk on their upper surfaces or are provided with marginal flanges 34, as shown in Figs. 13, 14 and 15, so that the lower ends of the posts 24 to 27 may be fitted in them and thereby held firm against displacement, as shown in Fig. 11. Said corner-plates rest on the members 22—23 of the base, and bolts 35, which pass through both members of the base and the superimposed post, serve to hold the parts fixedly together. This is well illustrated in Fig. 11, from an inspection of which it will be seen that the bolt 35 passes up through the side member 21, the overlying end member 22, the corner-plate 33, and the post 27. The base is further strengthened by means of braces 36, 37, 38 and 39, the ends of which are looped, as shown at 40 in Fig. 15, and fit in suitable recesses 41 provided in the corner-plates, as shown in Figs. 13 and 15. Said recesses are arranged diagonally to accommodate the diagonal arrangement of the braces, as shown in Fig. 10. The braces are connected at the center of the base by means of a bearing plate 42 in which the lower end of the mast is stepped,—said plate having hooks 43 at suitable points in its periphery to engage suitable loops provided at the inner ends of the braces, as shown in Fig. 5. If desired, any other suitable means may be provided for tightening the braces. By fitting the outer ends of the braces in the recesses in the corner-plates, as described, said plates in themselves serve as anchors for the braces, so that the strain is not applied wholly to the bolts 35. In fact, the parts may be arranged so that the entire strain is taken by the corner-plates. By the construction described the members of the base and supporting frame are firmly secured together, making it practically impossible for them to spread at the bottom, and a very light but strong base is secured.

43* indicates stake loops provided at the corners of the base, as shown in Fig. 5,—said loops being pivotally connected in any suitable way with the members of the base.

44, 45, 46 and 47 indicate angleirons bent to substantially U shape, as shown in Fig. 1, which serve to secure the posts 24—25—26—27 together at or near their upper ends, as best shown in Figs. 6 and 8. Said angleirons also serve to support the turntable 48, which is also an angleiron bent to circular form, as shown in Figs. 6 and 8,—the horizontal flange resting on the angleirons 44 to 47 while the vertical flange fits inside of said angleirons and is fixedly secured thereto in any suitable manner as by rivets or bolts. I thus provide horizontal and vertical tracks for suitable rollers carried by the mast, as hereinafter described.

The members 28—29 of the mast are set a distance apart, being farther apart intermediately than at their ends. At their lower ends they are connected by means of a block 49 which also serves as a pivot, being provided with a downwardly-projecting end 50 which fits into the bearing plate 42. Said block is provided with suitable recesses 51 to receive the lower ends of the members of the mast and with a rib 52 which projects beyond the members of the mast, as shown in Fig. 1, and is provided with holes 53 to receive the lower end of a brace 54, the upper end of which is connected with a hand-lever or sweep 55, as shown in Fig. 1. The inner end of said sweep projects between the members of the mast and is fixedly secured in place, being further secured by side braces 56, as shown in Fig. 1. The block 40 is also provided with a hook 57 to receive a pulley 58. Intermediately the members of the mast are connected by a casting 59, as shown in Figs. 6, 7 and 8. Said casting not only serves to unite the members of the mast but also supports horizontal and vertical pivots 60—61 for rollers 62—63, respectively, which run on the horizontal and vertical flanges of the turntable or track 48, as shown in Fig. 7. The casting 59 also carries a strut 64 over which extends a truss-rod 65 connecting the end portions of the mast, as shown in Figs. 1 and 9, and opposite said strut it carries a yoke 66 which is adjacent to and preferably a continuation of the pivot 60. Said yoke serves to support the inner end of a jib 67, which will be hereinafter described, as shown in Figs. 1, 7 and 8. In addition to the casting 59 a number of additional braces are provided for the members of the mast, as shown at 67ª, 68 and 69 in Fig. 4. 70 indicates a brace connecting the outer portion of the strut 64 with the brace 67ª.

At its upper end the mast carries a pulley 71, as best shown in Figs. 1 and 4. It also carries a swinging support 72 on which is mounted a pulley 73, as shown in Fig. 1.

74—75 indicate beveled bearing blocks oppositely disposed and secured to the members 28—29 of the mast, as shown in Figs. 6 and 8. Said blocks are arranged so that their outer margins are adjacent to the vertical track, and they serve as buffers to hold the mast substantially central.

As best shown in Fig. 1, the inner ends of the members 30—31 of the boom are connected with the members of the mast by a pivot 76,—said pivot being placed a short distance above the turntable, as shown. The fork is pivotally connected with the lower ends of the members of the boom by means of brackets 77, best shown in Fig. 16. Said brackets are fixedly secured to the upper surfaces of the lower end portions of the members of the boom and embrace horizontal pivots 78 carried in suitable castings 79 secured to the under side of a crossbar 80 which connects the several teeth 81 of the fork, as shown in Fig. 3. The castings 79 are placed a short distance from the ends of the fork, preferably between the second and third teeth from each end, as shown in Fig. 3, and they are provided with vertical lugs 82 arranged so that when the fork tips down to a certain point they engage the bracket 77, which prevents excessive tilting of the fork. The points of the fork teeth are protected by wrought iron guards or shoes 83 which fit upon the ends of the teeth and are secured by rivets or bolts 84, as shown in Fig. 18. Said shoes are simply strap iron bent to suitable shape and fitted to the upper and lower surfaces of the fork teeth, as shown in Fig. 18. They are inclined upward and backward, as shown, so that when the hay is raked upon the fork of the stacker by means of a horserake if the teeth of the fork strike the teeth of the stacker they will be thrown up without doing any substantial damage. For the same reason the forward edge of the crossbar 80, shown in Fig. 16, is beveled.

The fork is held in position in the same manner as described in my pending application by means of chains, or other flexible connections, 85, the lower ends of which pass around pulleys 86 and are connected with a bar 87 which forms the rear upper portion of the fork, as described in my said application. The upper portions of the chains 85 pass over a pulley 88 provided at the upper portion of the mast and are connected to a controlling lever or arm 89, which may be secured in different positions of adjustment. Any suitable means may be employed for securing the arm 89 in position, but I prefer the construction shown in my application hereinbefore referred to. I also prefer, instead of employing continuous chains 85, to provide intermediate rods 90, which are less apt to become entangled; but any other suitable flexible connections may be employed.

91—92 indicate bars arranged in the form of a V,—their separated ends being fixedly connected to the inner end portions of the members 30—31 of the boom. The outer ends of said bars are connected together and carry a pulley 93, as shown in Fig. 1. They also are connected by rods 94—95 with the outer portions of the members 30—31 of the boom. The bars 91—92 have no movement independently of the boom and serve as a fixed jib which transmits lifting force to the boom in a more favorable direction, as will hereinafter appear. This jib is in effect a part of the boom.

The jib 67, which, as has been stated, is pivotally carried by the yoke 66, extends out from the turntable and is connected with the outer end portions of the bars or jib 91—92 by means of rods 96, the upper ends of which are pivotally connected intermediately to the jib 67, as shown at 97 in Fig. 1. The lower ends of said rods are connected with the end portions of the shaft 103 which carries the pulley 93, as shown in Fig. 19, and lie outside of the bars 91—92. The diverging bars 91 support the shaft 103 and by reason of their divergence act the better to counteract any tendency of the boom to sag at one side due to unequal distribution of the load on the fork. The rods 96 also assist in supporting said shaft.

98 indicates a frame carried by the jib 67 and extending out beyond the outer end thereof, as shown in Fig. 1,— said frame carrying inner and outer pulleys 99—100, respectively.

101 indicates a hoisting-rope, one end of which is connected with the outer end of the jib 67, as shown at 102 in Fig. 1. Said rope then extends from the point 102 around pulley 73, thence over pulley 99 carried by the jib, thence around pulley 93 carried by the bars 91—92, thence over pulley 100 carried by the jib and pulley 71 at the upper end of the mast, and thence down around pulley 58 at the lower end of the mast. A team is hitched to the lower end of the rope for hoisting purposes.

It will be noted that the pivot or fulcrum of the jib 67 is below the pivot or fulcrum of the boom. By this construction, when the jib is swung upward, the outer ends of the boom and of the fixed jib 91—92 move outward relatively to the outer end of the jib 67, and consequently the lifting strain is transmitted during practically the entire operation at right angles to the boom, thus securing its greatest efficiency. The boom also moves more rapidly than the jib 67, due to the fact that the axis or pivot of the boom is at a point removed from the axis or pivot of said jib 67.

It will be noted that the weight of the mast is carried on the turntable or track at the upper end of the posts composing the frame, the bearing plate 42 serving merely to hold the lower end of the mast in position,—in this respect the operation being substantially the same as that described in my pending application, hereinbefore referred to.

While I have described my improved stacker in detail, I wish it to be understood that I do not restrict myself to the particular features of construction shown and described, except in so far as they are particularly claimed, as my invention includes generically the subject-matter of the broader claims.

That which I claim as my invention and desire to secure by Letters Patent is,—

1. In a hay-stacker, the combination of a boom pivotally mounted to swing vertically, an arm pivotally mounted independently of said boom and arranged to swing vertically about an axis eccentric to the axis of the boom, means for causing said arm and boom to move simultaneously in the same direction but at different rates of speed, and hoisting means.

2. In a hay-stacker, the combination of a boom pivotally mounted to swing vertically, an arm pivotally mounted independently of said boom and arranged to swing vertically about an axis eccentric to the axis of the boom, means connecting said arm and boom and acting to cause them to move simultaneously in the same direction but at different rates of speed, and hoisting means.

3. In a hay-stacker, the combination of a support pivoted to turn on a vertical axis, a boom pivotally mounted on said support to swing vertically, an arm pivotally mounted independently of said boom and arranged to swing vertically about an axis eccentric to the axis of the boom, means for causing said boom to move at a higher rate of speed than said arm, and hoisting means.

4. In a hay-stacker, the combination of a boom pivotally mounted to swing vertically, an arm pivotally mounted independently of said boom, hoisting mechanism supported by said arm and connected with said boom, and means for moving said boom at a higher rate of speed than said arm.

5. In a hay-stacker, the combination of a boom pivotally mounted to swing vertically, an arm pivotally mounted independently of said boom, hoisting mechanism supported by said arm and connected with said boom, means for moving said boom at a higher rate of speed than said arm, and a support for said boom and arm pivoted to turn on a vertical axis.

6. In a hay-stacker, the combination of a support, a boom pivotally connected therewith, an arm pivotally mounted independently of the boom, means connecting said arm with said boom and acting to cause the boom to move at a higher rate of speed than said arm, and hoisting means for elevating the boom.

7. In a hay-stacker, the combination of a support pivoted to turn on a vertical axis, a boom pivotally connected with said support, an arm pivotally mounted independently of the boom at a point removed from the pivot of the boom and adapted to rotate with said support, means connecting said arm with said boom and arranged to cause said boom to move at a higher rate of speed than said arm, and hoisting means.

8. In a hay-stacker, the combination of a mast, a boom pivotally supported by said mast, an arm pivotally mounted independently of the boom at a point removed from the pivot of the boom and adapted to rotate with said mast, means connecting said arm with said boom, and hoisting means.

9. In a hay-stacker, the combination of a mast, a boom pivotally connected with said mast, an arm pivotally connected with said mast at a point removed from the pivot of the boom, and means connecting the outer portions of said boom and arm.

10. In a hay-stacker, the combination of a mast, a boom pivotally connected with said mast, an arm pivotally connected with said mast at a point removed from the pivot of the boom, means connecting the outer portions of said boom and arm, and hoisting means mounted on the mast and connected with said arm.

11. In a hay-stacker, the combination of a mast, a boom pivotally connected with said mast, an arm pivotally connected with said mast at a point removed from the pivot of the boom, means connecting the outer portions of said boom and arm, and hoisting means mounted on the mast and connected with said arm and with the boom.

12. In a hay-stacker, the combination of a mast, a boom, a fixed jib rigidly connected with the inner portion of said boom and extending at an angle therewith, an arm pivotally mounted at a point removed from the pivot of the boom, and means connecting said arm with said fixed jib.

13. In a hay-stacker, the combination of a mast, a boom pivotally connected therewith and extending outwardly therefrom, a fixed jib connected with the inner portion of said boom and extending at an angle therewith, a fork carried by the boom at its outer end, diverging rods connecting the outer end portion of said fixed jib with the outer portion of the boom, an arm pivotally connected to rotate with the mast, and means connecting said arm with the outer portion of said fixed jib.

14. In a hay-stacker, the combination of a mast, a boom pivotally connected therewith, bars diverging toward the mast and connected with the outer portion of the boom, an arm pivotally mounted to rotate with said mast, and means connecting said arm with the outer portion of the boom.

15. In a hay-stacker, the combination of a mast, a boom pivotally connected therewith, a fixed jib connected at one end with the boom and extending at an angle therewith, a shaft carried by said fixed jib, a pulley mounted on said shaft, diverging rods connecting the end portions of said shaft with the outer portions of the boom, an arm pivotally mounted to rotate with the mast, and rods connecting said arm with the end portions of said pulley shaft.

16. In a hay-stacker, the combination of a mast, a boom pivotally connected at one end with said mast, a fixed jib comprising bars connected at their ends with the boom and extending at an angle therewith, a second jib pivoted to rotate with the mast and extending outwardly and upwardly over said fixed jib, means connecting said second jib with the outer end portions of said fixed jib, and hoisting devices carried by the mast, and said jibs.

17. In a hay-stacker, the combination of supporting means, an annular track carried thereby, a mast extending through said track, bearing blocks carried at the sides of said mast, and hoisting mechanism connected with said mast.

18. In a hay-stacker, the combination of supporting means, an annular track carried thereby, a mast extending through said track, a support carried by the mast, horizontal and vertical rollers connected with said support, a jib pivotally connected with said support, a boom pivotally connected with the mast, means connecting said jib with said boom, and hoisting devices.

19. In a hay-stacker, the combination of supporting means, an annular track carried thereby, a mast extending through said track, a support carried by the mast, horizontal and vertical rollers connected with said support, a jib pivotally connected with said support, a boom pivotally connected with the mast, means connecting said jib with said boom, hoisting devices, a strut connected with said support, and a truss connected with the end portions of said mast and engaging said strut.

20. In a hay-stacker, the combination of a polygonal base having corner-plates, converging posts resting on said corner-plates and connected together at their upper ends, a bearing plate at the center of said base, braces connected with said bearing plate and with said corner-plates, a track carried by said posts, a mast stepped in said bearing plate and extending up through said track, and elevating mechanism connected with said mast.

21. A base for hay-stackers, comprising side and end members fitted together, corner-plates, converging posts resting on said corner-plates, and bolts connecting said side and end members, said corner-plates and said posts.

22. A base for hay-stackers, comprising side and end members fitted together, corner-plates, converging posts resting on said corner-plates, bolts connecting said side and end members, said corner-plates and said posts, and diagonal braces connected with said corner-plates.

23. A base for hay-stackers, comprising side and end members fitted together, corner-plates, converging posts resting on said corner-plates, bolts connecting said side and end members, said corner-plates and said posts, a central bearing plate, and diagonal braces connected with said bearing plate and with said corner-plates.

24. A base for hay-stackers, comprising side and end members fitted together, corner-plates, converging posts resting on said corner-plates, bolts connecting said side and end members, said corner-plates and said posts, and diagonal braces connected with said corner-plates, said corner-plates being recessed to receive said converging posts.

JOSEPH DAIN.

Witnesses:
C. E. PICKARD,
MINNIE A. HUNTER.